United States Patent [19]
Yanagisawa

[11] Patent Number: 5,165,296
[45] Date of Patent: Nov. 24, 1992

[54] DRIVE SYSTEM

[76] Inventor: Ken Yanagisawa, c/o, Kabushiki Kaisha Mechanic Sekkei Jimu, 5175-1, Ooaza Toyoshina, Toyoshina-machi, Minamiazumi-gun, Nagano-ken, Japan

[21] Appl. No.: 637,338

[22] Filed: Jan. 3, 1991

[30] Foreign Application Priority Data

Jan. 12, 1990 [JP] Japan .................. 2-5691
Jan. 12, 1990 [JP] Japan .................. 2-5692

[51] Int. Cl.⁵ .............. G05G 11/00; F16H 25/20; F16H 19/06
[52] U.S. Cl. .................. 74/479; 74/89.15; 74/89.22; 108/143; 248/913; 901/16
[58] Field of Search .......... 74/89.14, 89.15, 89.2, 74/89.22, 471 XY, 479; 108/143; 33/1 M; 248/913; 269/60, 71; 250/442.1; 359/393; 310/328; 414/749; 901/16

[56] References Cited

U.S. PATENT DOCUMENTS

| | | | |
|---|---|---|---|
| 1,985,265 | 12/1934 | Smith | 33/1 M |
| 2,628,497 | 12/1971 | Neu | 33/1 M X |
| 2,847,859 | 8/1958 | Lynott | 33/1 M X |
| 2,857,032 | 10/1958 | Johnson et al. | 33/1 M X |
| 3,422,538 | 1/1969 | Panissidi | 33/1 M X |
| 3,495,519 | 2/1970 | Alsen et al. | 108/143 X |
| 3,764,900 | 10/1973 | Baldwin | 33/1 M X |
| 4,171,657 | 10/1979 | Halberschmidt et al. | 83/866 |
| 4,409,860 | 10/1983 | Moriyama et al. | 108/143 X |
| 4,607,166 | 8/1986 | Tamaki | 310/328 X |
| 4,729,536 | 3/1988 | Scala | 248/429 |
| 4,995,277 | 2/1991 | Yanagisawa | 74/479 X |

FOREIGN PATENT DOCUMENTS

0265855 5/1988 European Pat. Off. .
3628202 2/1988 Fed. Rep. of Germany .
63-191533 8/1988 Japan .

*Primary Examiner*—Allan D. Herrmann

[57] ABSTRACT

Combining a plurality of two dimensional drive systems, a plurality of moving bodies can be independently moved by each of the two dimensional drive systems. Therefore, tools, robot-heads, work, etc. attached to the moving bodies can be moved independently. By attaching one of the two dimensional drive systems to another, the movement of both moving bodies are composed, so that the moving body of the one attached to another can be moved compositely. Therefore, the moving body or a tool, etc. attached thereto can be moved in a complex motion.

9 Claims, 10 Drawing Sheets

DRIVE SYSTEM

BACKGROUND OF THE INVENTION

The present invention relates to a drive system, more specifically relates to a drive system which is capable of moving a plurality of moving bodies.

Conventionally, many types of drive systems have existed. Some of them were disclosed in Japanese Patent Kokai No. 63-191533, U.S. Pat. No. 2,857,032, No. 3,422,538 and No. 4,171,657, German Patent No. DE-36 28 202A, and European Patent No. EP-265-855-A. All of them are capable of moving one moving body to discretionary positions in a plane. Tools for machining, instruments for inspection or measurement, work to be machined, robot-heads, etc. can be attached to the moving body and are moved to prescribed positions for machining, etc.

Those conventional drive systems, however, have the following disadvantages.

A plurality of, for example, tools cannot be independently moved because each conventional drive system has only one moving body.

Figure 12:
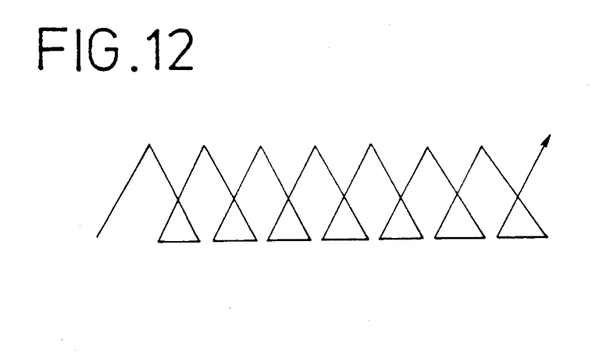
FIG. 12 shows an explanation view of locus of a tool attached to the drive system of the fifth embodiment.

In the case of moving a tool attached to a moving body along the locus shown in FIG. 12, a control program of a computer for controlling the movement of the moving body must be very complex and difficult to write. Further, the computer must have large memory capacity because of a complex program, so that drive systems must be very expensive.

SUMMARY OF THE INVENTION

First object of the present invention is to provide a drive system which is capable of moving a plurarilty of moving bodies independently.

Second object of the present invention is to provide a drive system which is capable of moving a moving body along complex locus with a simple computer control program.

To achieve above objects, the present invention has the following structures.

To achieve the first object, a drive system comprises a plurality of two dimensional drive systems connecting each other, each of the two dimensional drive systems being capable of moving a moving body to discretionary positions in a plane by driving means.

While, to achieve the second object, a drive system comprises a first two dimensional drive system being capable of moving a first moving body to discretionary positions in a plane by first driving means, and a second two dimensional drive system being capable of moving a second moving body, to which the first two dimensional drive system is provided, to discretionary positions in a plane by second driving means.

In the former structure, a plurality of moving bodies are respectively moved by each of the two dimensional drive systems, so that each moving body can be moved independently. Therefore, when tools, robot-heads, etc. are respectively attached to each moving body, a plurality of tools, robot-heads, etc. can be moved independently, and efficient operation can be executed.

In the latter structure, the movement of the first moving body and of the second moving body can be composed. Therefore, even if the locus for operating the tools, etc. is complex, the complex locus can be decomposed into the movement of the first and the second moving bodies. Therefore, each movement decomposed can be simpler locus, and the computer control programs also can be simpler. The memory capacity of the control computer may be small. The cost for making the program can be reduced. Further, the mass of the first moving body is smaller than of the second moving body, so that vibration can be suppressed when the first moving body turns because of small inertia.

BRIEF DESCRIPTION OF THE DRAWINGS

Embodiments of the present invention will now be described by way of examples and with reference to the accompanying drawings which are given by way of illustration only, and thus are not limitative of the present invention, and in which.

DETAILED DESCRIPTION OF THE PREFERRED EMBODIMENTS

Preferred embodiments of the present invention will now be described in detail with reference to accompanying the drawings.

First Embodiment

The first embodiment will be explained with reference to FIGS. 1-4.

Figure 1:
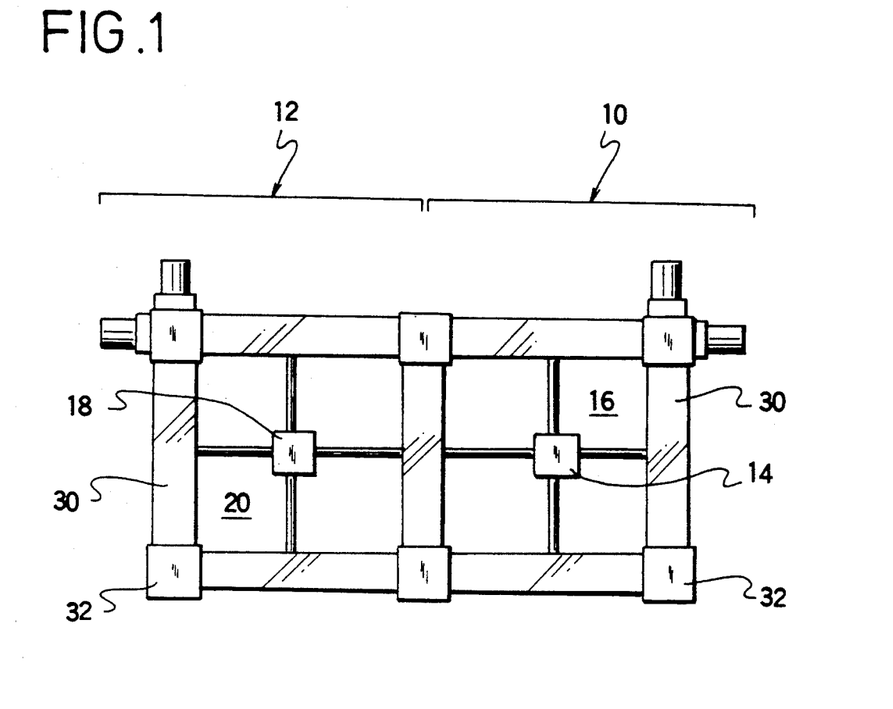
FIG. 1 shows a plan view of a drive system of a first embodiment.
Figure 2:
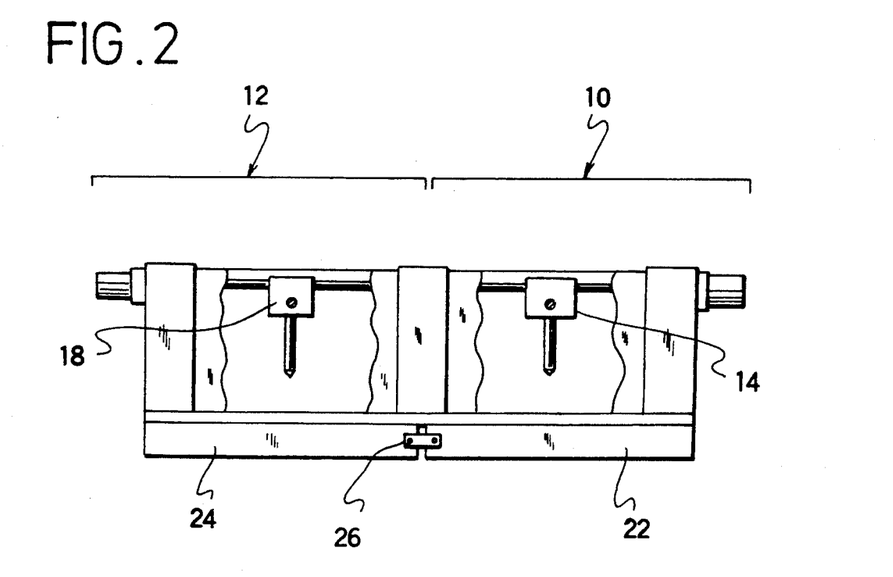
FIG. 2 shows a front view, with portions broken away for clarity, of First Embodiment.

In FIGS. 1 and 2, a first two dimensional drive system 10 and a second two dimensional drive system 12 are connected to each other in a horizontal plane. A slider 14 as a moving body can be moved to discretionary positions in a rectangle plane 16 of the first two dimensional drive system 10; a slider 18 as a moving body can be moved to discretionary positions in a rectangle plane 20 of the second two dimensional drive system 12.

The first two dimensional drive system 10 is mounted on a base 22; the second two dimensional drive system 12 is mounted on a base 24. Both bases 22 and 24 are connected by connecting means 26 to substantially form into one body.

Next, the two dimensional drive systems 10 and 12 are explained with reference to FIG. 3. The structure of the first two dimensional drive system 10 only will be explained. The explanation of the second two dimensional drive system 12 will be omitted because both drive systems 10 and 12 have the same structure.

Figure 3:
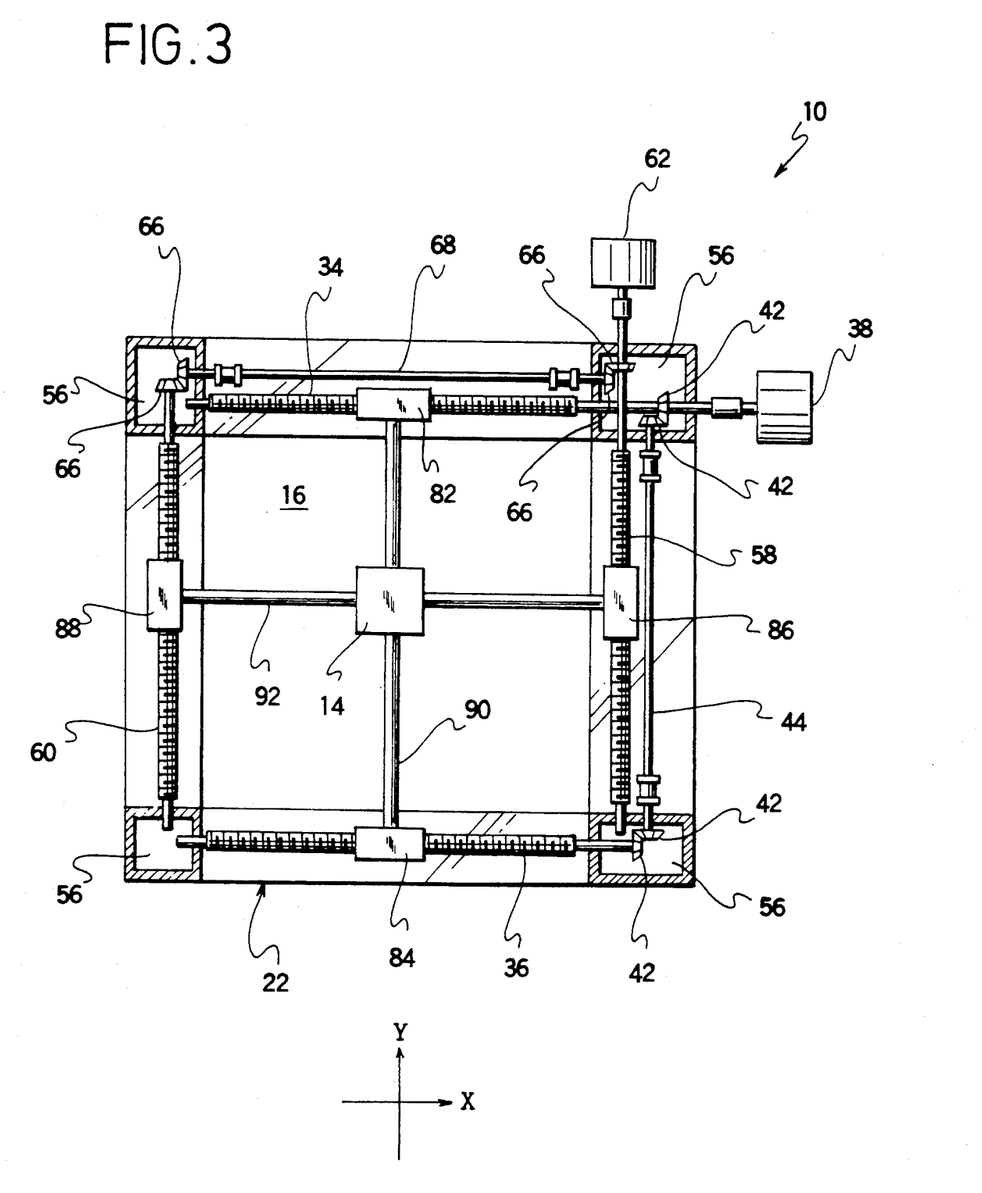
FIG. 3 shows a plan view of one of two dimensional drive systems connected.

FIG. 3 shows a plan view of the first two dimensional drive system 10 whose upper covers 30 and gear box covers 32 (see FIG. 1) are detached.

The base 22 is formed into a rectangle frame shape and its center part is hollow.

X-ball bearing screws 34 and 36 are mutually arranged in parallel in a horizontal plane. The X-ball bearing screw 34 is directly rotated by a motor 38; the rotational torque of the motor 38 is transmitted to the X-ball bearing screw 36 to rotate via a transmitting mechanism including bevel gears 42, a transmitting shaft 44, etc. The end portions of the X-ball bearing screws 34 and 36 are respectively and rotatably supported by gear boxes 56.

Y-ball bearing screws 58 and 60 are mutually arranged in parallel in a horizontal plane, which is almost in the same level of the plane in which the X-ball bearing screws 34 and 36 are arranged, and the Y-ball bearing screws 58 and 60 are perpendicularly crossed with the X-ball bearing screws 34 and 36. The Y-ball bearing screw 58 is directly rotated by a motor 62; the rotation torque of the motor 62 is transmitted to the Y-ball bearing screw 60 to rotate via a transmitting mechanism including bevel gears 66, a transmitting shaft 68, etc. The end portions of the Y-ball bearing screws 58 and 60 are respectively and rotatably supported by gear boxes 56.

X-travellers 82 and 84 are respectively screwed on the X-ball bearing screws 34 and 36. Both ends of a X-rod 90, which passes through the slider 14, are respectively fixed at the X-travellers 82 and 84. Thus, the X-travellers 82 and 84 are prevented from rotating by the X-rod 90, and both of the travellers 82 and 84 can be moved in the same direction when the X-ball bearing screws 34 and 36 synchronously rotate in the same direction.

Y-travellers 86 and 88 are respectively screwed on the Y-ball bearing screws 58 and 60. Both ends of a Y-rod 92, which passes through the slider 14, and which perpendicularly crosses the X-rod 90 therein, are respectively fixed at the Y-travellers 86 and 88. Thus, the Y-travellers 86 and 88 are prevented from rotating by the Y-rod 92, and the both travellers 86 and 88 can be moved in the same direction when the Y-ball ball bearing screws 58 and 60 synchronously rotate in the same direction.

The X- and Y-rods 90 and 92 pass through the slider 14 and mutually cross therein at the right angle, so that the slider 14 moves in the X-direction with the movement of the X-travellers 82 and 84; the slider 14 moves in the Y-direction with the movement of the Y-travellers 86 and 88. With this X-Y movement, the slider 14 can be moved to discretionary positions in the plane 16. Note that, the X- and Y-rods 90 and 92 may be made by metal rods having proper hardness and elasticity.

In FIG. 3, the motors 38 and 62 are provided to the side faces of the gear box 56. However, the motors 38 and 62 may be provided to upper sections over the upper covers 30 with such connecting mechanisms (not shown) as gears, belt and pulley mechanisms, etc. If the motors 38 and 62 are provided to the upper section, there are no projected portions in all side faces of the first two dimensional drive system 10, so that four two dimensional drive systems can be respectively connected to each side face thereof.

Note that, the reason why the second two dimensional drive system shown in FIG. 3 is adopted as the first and the second two dimensional drive systems 10 and 12 is that the positioning accuracy of the sliders 14 and 18 is quite high with above the described structure.

Figure 4:
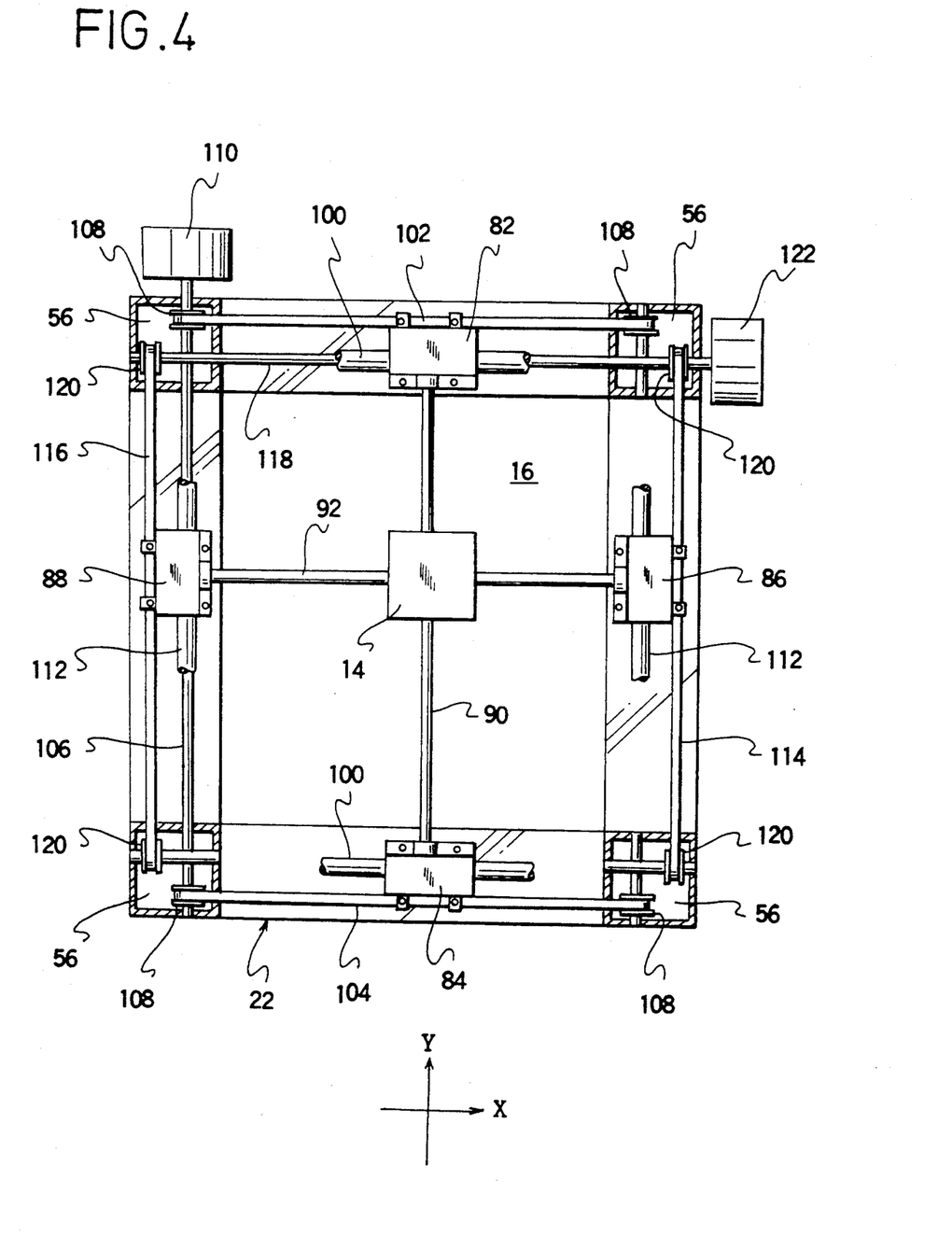
FIG. 4 shows a plan view of another example of the two dimensional drive system.

Another example of the first and the second two dimensional drive systems 10 and 12 is shown in FIG. 4. Note that, some elements, which are the same as the elements shown in FIG. 3 are assigned the same numerals and the explanation thereof will be omitted.

X-travellers 82 and 84 are capable of moving on an X-guide 100, which is spanned between gear boxes 56. The X-travellers 82 and 84 are respectively connected to endless belts 102 and 104, which are arranged in parallel in the X-direction. The endless belts 102 and 104 are driven by a motor 110 and a transmitting mechanism having a shaft 106 and pulleys 108.

While, Y-travellers 86 and 88 are capable of moving on a Y-guide 112, which is spanned between gear boxes 56. The Y-travellers 86 and 88 are respectively connected to endless belts 114 and 116, which are arranged in parallel in the Y-direction. The endless belts 114 and 116 are driven by a motor 122 and a transmitting mechanism having a shaft 118 and pulleys 120.

The above described structure, a slider 14 is capable of moving in a rectangle plane 16 with the rotation of the motors 110 and 112.

Two examples of two dimensional drive system for the drive system of the first embodiment are shown in FIGS. 3 and 4 but other types of two dimensional drive system, e.g. U.S. Pat. No. 4,729,536, can be adopted. Note that, the examples of FIGS. 3 and 4, etc. can be adopted as two dimensional drive systems in the following embodiments.

Figure 5:
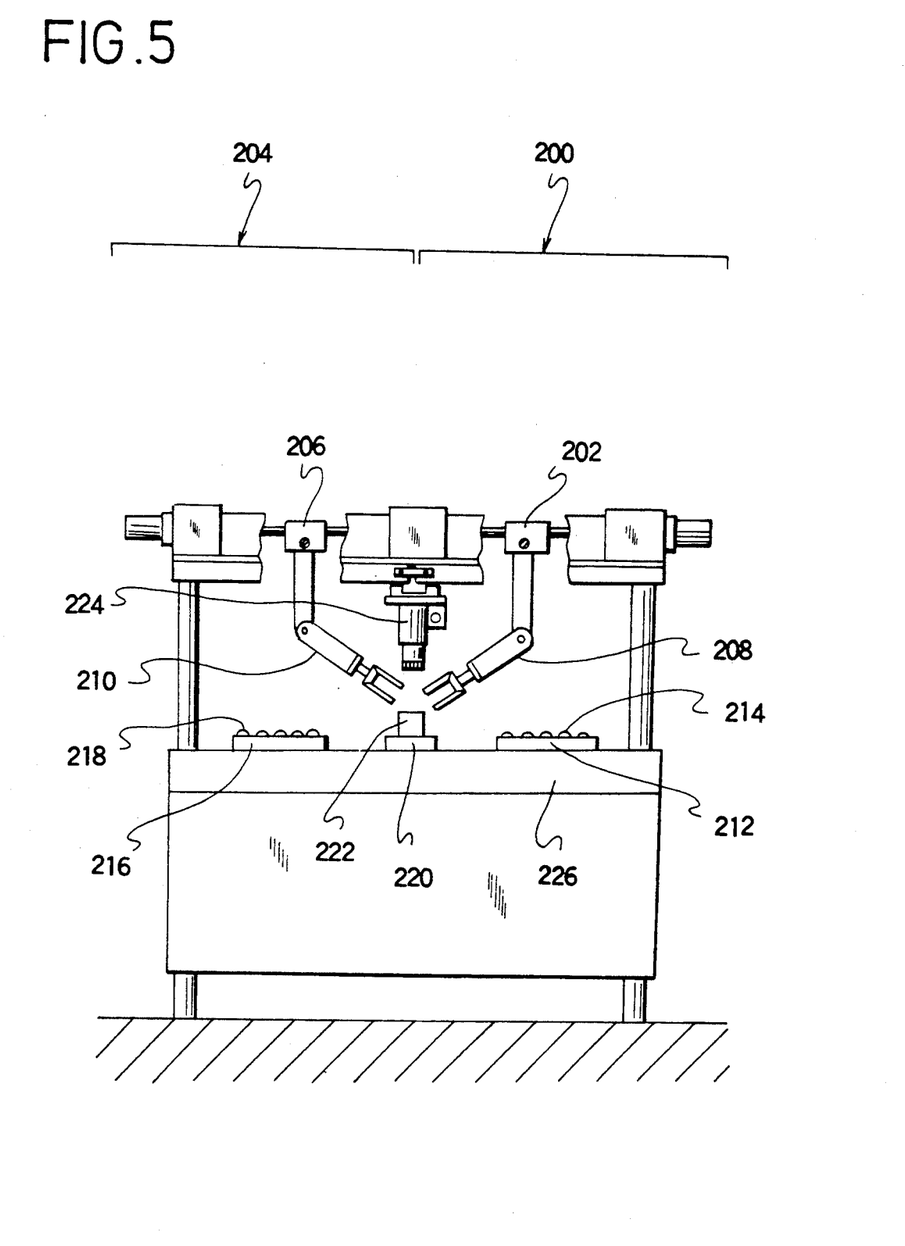
FIG. 5 shows a front view, with portions broken away for clarity, of an assembling machine using the drive system of the first embodiment.
Figure 6:
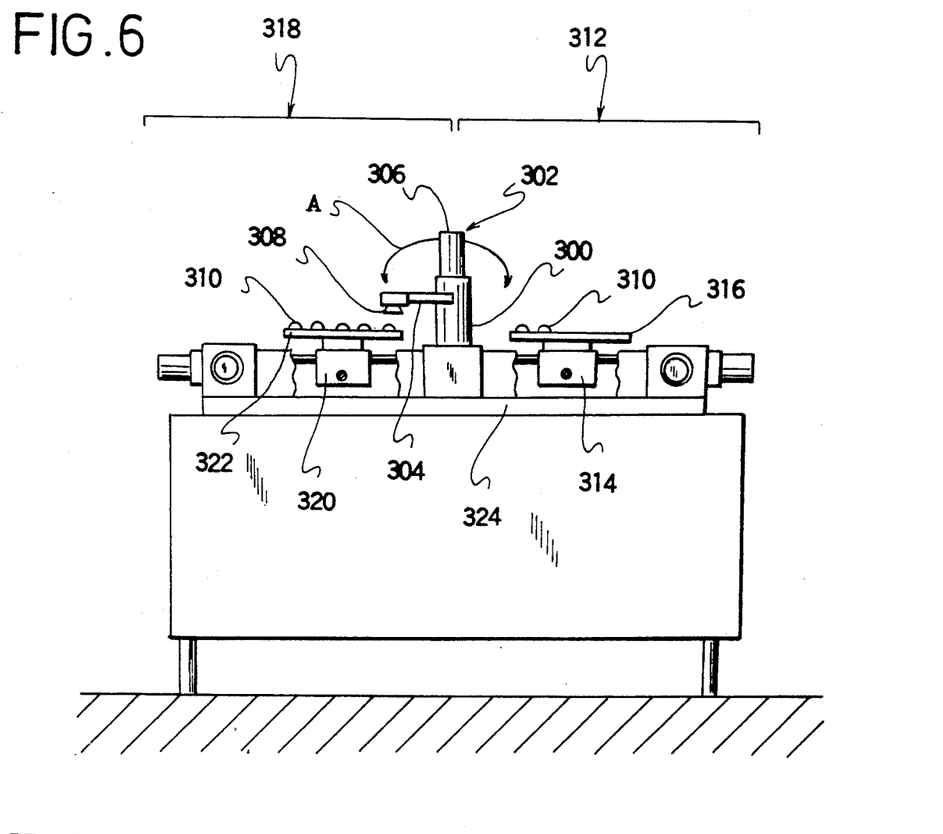
FIG. 6 shows a front view, with portions broken away for clearity, of a transforming machine using the drive system of the first embodiment.

Successively, machines using the drive system of first embodiment will be shown in FIGS. 5 and 6.

In FIG. 5, an assembling machine is shown. In the machine, robot-arms 208 and 209 are respectively attached to a slider 202 of a first two dimensional drive system 200 and a slider 206 of a second two dimensional drive system 204. The robot-arm 208 is capable of gripping parts 214 on a parts stage 212 and moving with the movement of the slider 202. While, the robot-arm 210 is capable of gripping parts 218 on a parts stage 216 and moving with the movement of the slider 206. The robot-arms 208 and 210 are able to assemble the parts 214 and 218 in the air or on an assembling stage 220 so as to make a product 222. The assembling process of the product 222 is monitored by a C.C.D.-camera 224.

In this assembling machine, the robot-arms 208 and 210 can be mutually and independently operated. The positioning accuracy of the sliders 202 and 206 are quite high, so that high degree complex assembling can be executed. Note that, the movement of the slider 202 and 206 and the robot-arms 208 and 210 are fuzzy controlled by a computer.

In FIG. 6, this machine is a transfer machine. A transferring mechanism 302 has a center block 300, whose plane position on the machine is fixed, and a transferring arm 304, which is capable of turning as shown by an arrow A by a motor 306. There is provided a sucker 308 at the front end of the transferring arm 304. The sucker 308 is connected to a vacuum generator (not shown) so as to suck and to release parts 310. There is attached a pallet 316 on which parts 310 have been previously arranged on a slider 314 of a first two dimensional drive system 312. While, there is attached a pallet 322 to which the parts 310 on the slider 314 are transferred on a slider 320 of a second two dimensional drive system 318.

In this transfer machine, the sliders 314 and 320 change their plane position for every transferring operation because the locus of the transferring arm 304 cannot be changed. The parts 310 on the pallet 316 are sucked by the sucker 308, and the transferring arm 304 turns to the left. Upon reaching over the pallet 322, the sucker 308 releases the parts 310 so as to transfer the parts 310 to the pallet 322. Note that, a base 324 is not divided but is one body.

In the example shown in FIGS. 1 and 2, the two dimensional drive systems 10 and 12 respectively have the bases 22 and 24, and both bases 22 and 24 are connected with each other. While, in the example shown in FIG. 6, the two dimensional drive systems 312 and 318 have a common base 324. In both cases, the two dimensional drive systems are substantially mounted on one base. If two or more two dimensional drive systems are located in one vibration system, mutual discrepancy of sliders can be suppressed.

Second Embodiment

Figure 7:
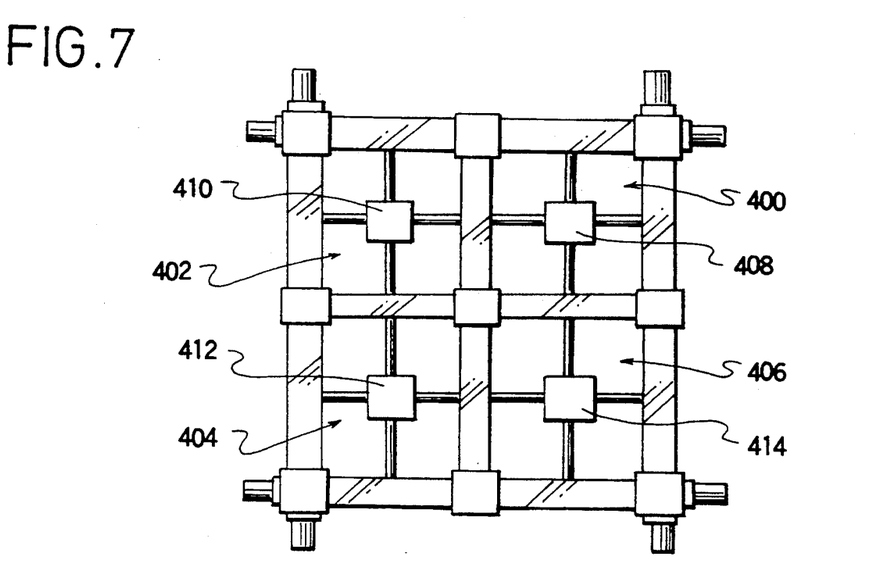
FIG. 7 shows a plan view of a drive system of a second embodiment.

The second embodiment will be explained with reference to FIG. 7.

This drive system has four two dimensional drive systems 400, 402, 404 and 406, which are mutually connected in a plane. Tools, robot-heads, work, etc. can be attached to sliders 408, 410, 412 and 414, and they can be moved independently.

Third Embodiment

Figure 8:
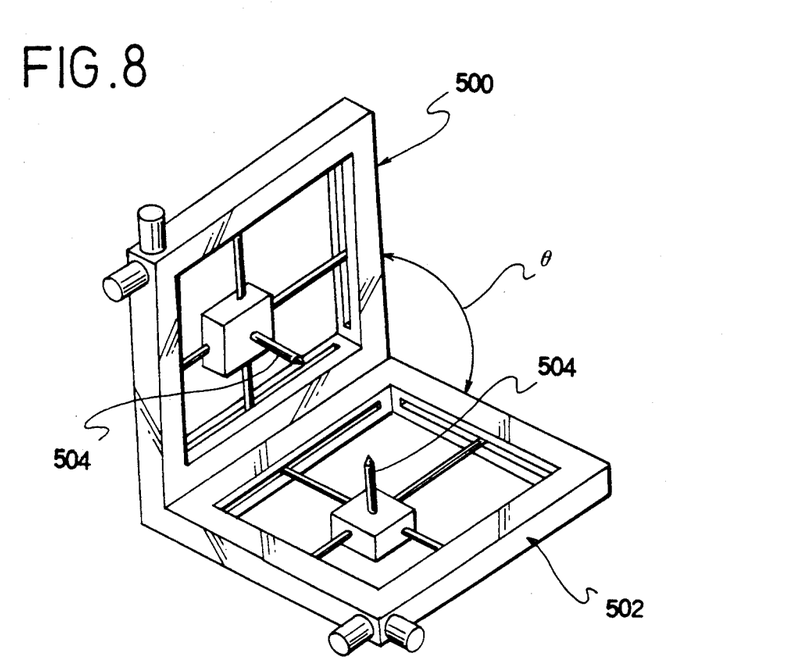
FIG. 8 shows a perspective view of a drive system of a third embodiment.

The third embodiment will be explained with reference to FIG. 8.

In this embodiment, a couple of two dimensional drive systems 500 and 502 are combined three-dimensionally. The two dimensional drive systems 500 and 502 are connected with the right angle ("θ"). With this structure, for example, a work (not shown), which is located between the two dimensional drive systems 500 and 502, can be machined from two directions by tools 504, which are respectively attached to the two dimensional drive systems 500 and 502. Note that, the angle "θ" is not limited to a right angle.

Fourth Embodiment

Figure 9:
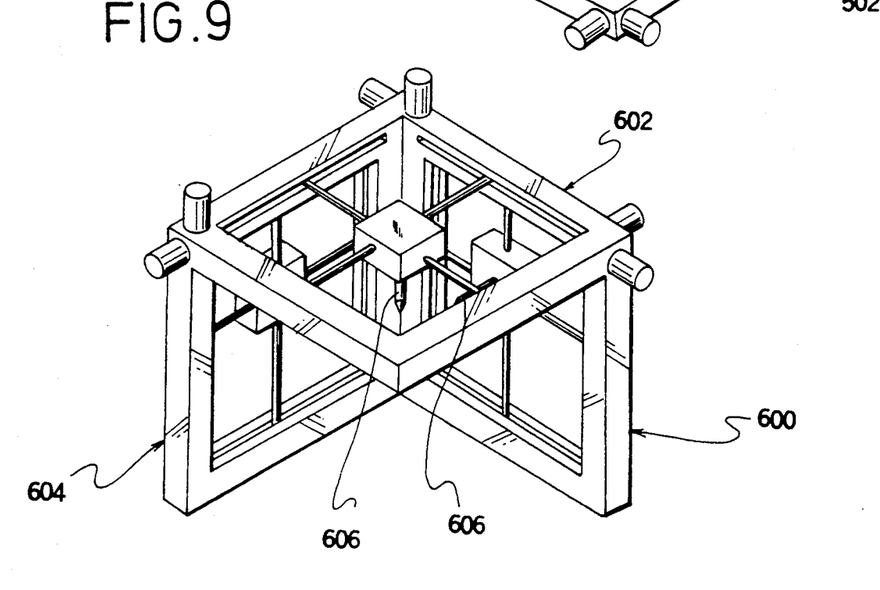
FIG. 9 shows a perspective view of a drive system of a fourth embodiment.

The fourth embodiment will be explained with reference to FIG. 9.

In this embodiment, three two dimensional drive systems 600, 602 and 604 are mutually combined with right angles. For example, a work (not shown), which is located among the two dimensional drive systems 600, 602 and 604, can be machined from three directions by tools 606, which are respectively attached to the two dimensional drive systems 600, 602 and 604. The drive system of the fourth embodiment can be combined with the drive system of former embodiments, so four or more two dimensional drive systems can be connected three-dimensionally.

Fifth Embodiment

The fifth embodiment will be explained with reference to FIGS. 10-14.

Figure 10:
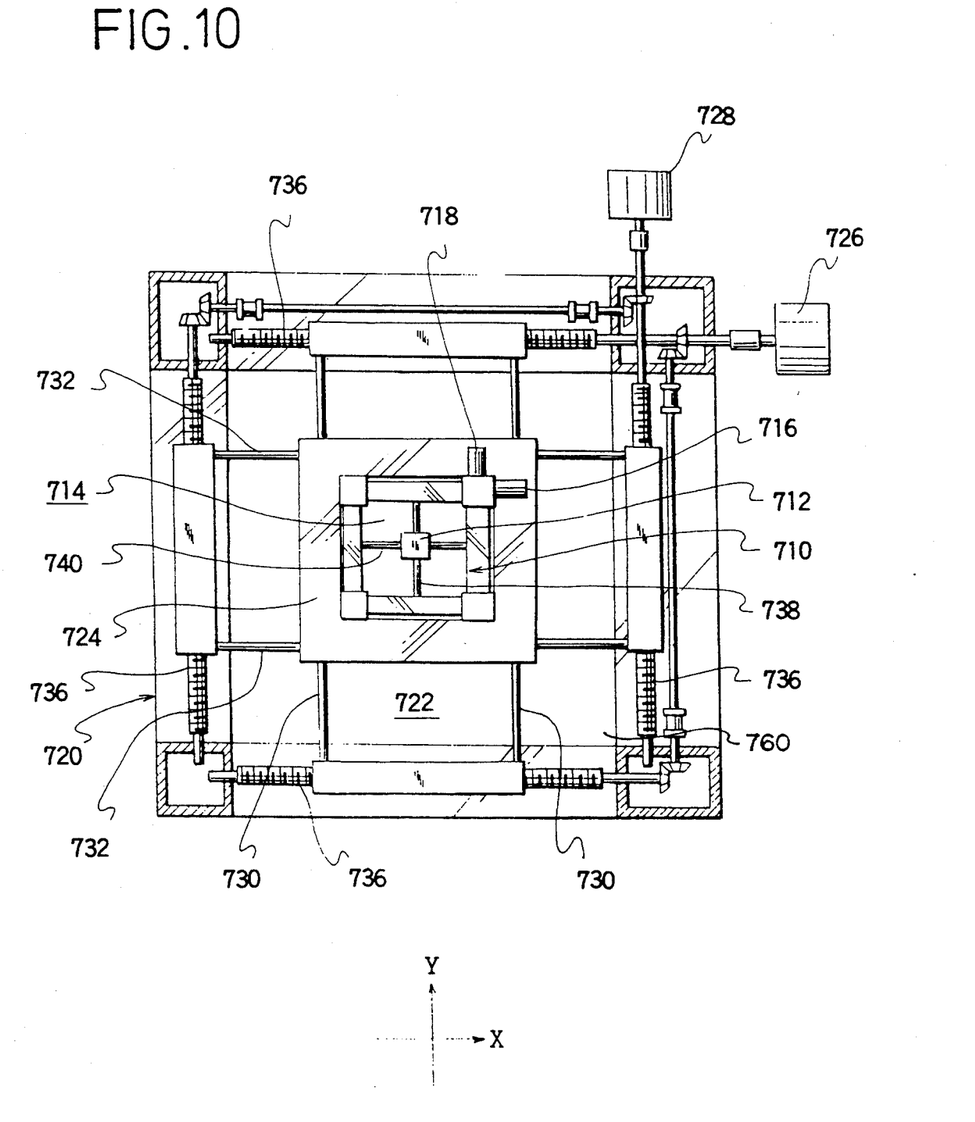
FIG. 10 shows a plan view of a drive system of a fifth embodiment.
Figure 11:
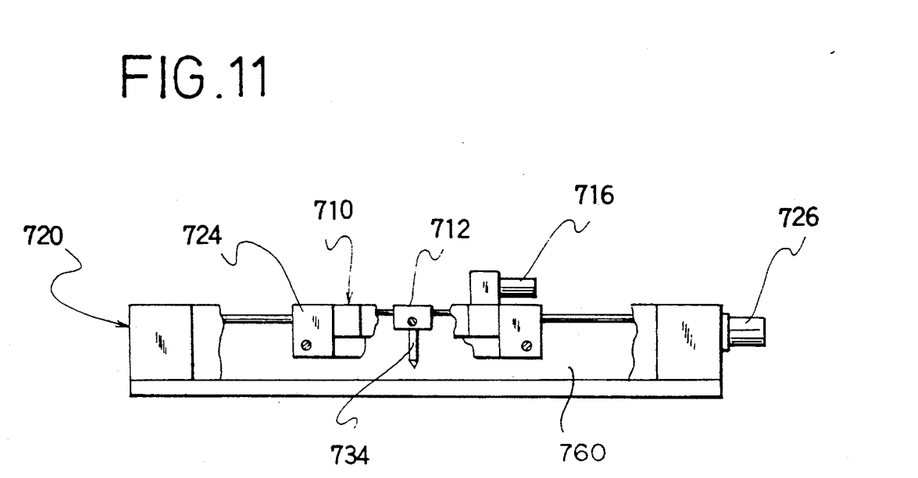
FIG. 11 shows a front view, with portions broken away for clarity, of a drive system of the fifth embodiment.

In FIGS. 10 and 11, numeral 710 is a first two dimensional drive system whose slider 712 is capable of moving to discretionary positions in a rectangle plane 714. The slider 712 is controlled in its positioning by driving motors 716 and 718, which are controlled by a computer (not shown). The structure of the first two dimensional drive system 710 is the same as the two dimensional drive systems 10 and 12 of the first embodiment (see FIGS. 3 and 4), so that explanation is omitted.

Numeral 720 is a second two dimensional drive system whose slider 724 is capable of moving to discretionary positions in a rectangle plane 722. The slider 724 is also in its positioning by driving motors 726 and 728, which are controlled by the computer. The first two dimensional drive system 710 is provided in the slider 724. The slider 724 is formed into a rectangle frame shape with hollow center section. The first two dimensional drive system 710 is fixed in the hollow center section by bolts (not shown), etc. The structure of the second two dimensional drive system 720 is almost the same as the first two dimensional drive system 710 except accommodating the first two dimensional drive system 710 in the slider 724 in a through-hole 760 and having a couple of X-rods 730 and a couple of Y-rods 732.

In this embodiment, the height of the plane 714 in which the slider 712 moves and the height of the plane 722 in which the slider 724 moves are almost the same but they may not be the same. The first two dimensional drive system 710 may be provided on the upper and/or the lower side of the slider 724 of the second two dimensional drive system 720, and, in this case, the slider 724 need not be in the frame shape.

Figure 13:
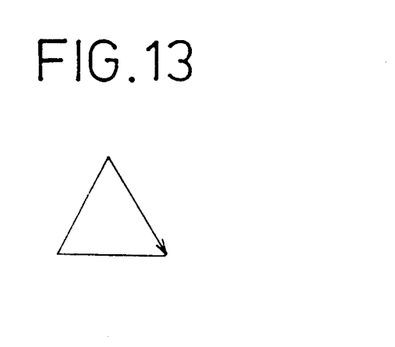
FIGS. 13 and 14 respectively show explanation views of locus of the first and the second moving bodies for composing to make the locus shown in FIG. 12.
Figure 14:
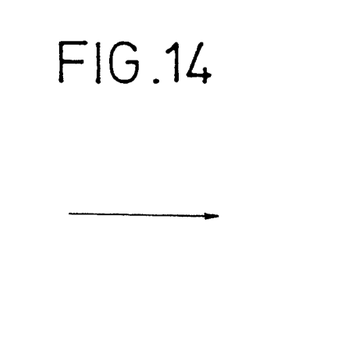

In the double drive system of this embodiment, for example, if locus of tool 734, which is attached to the slider 712, is as shown in FIG. 12, locus of the slider 712 may be as shown in FIG. 13; locus of the slider 724 may be as shown in FIG. 14. Namely, composed movement of the sliders 712 and 724 will be the movement of the tool 734, so that the tool 734 is capable of moving with locus shown in FIG. 12. Each movement of the sliders 712 and 724 may be simple (see FIGS. 13 and 14), so that control program of the computer may be simple and easy to write.

If pitch of ball-bearing screws 736 of the second two dimensional drive system 720 is designed to be larger than pitch of ball-bearing screws (not shown) of the first two dimensional drive system 710, the slider 724 can be moved at high speed; the slider 712 can be moved precisely at the same time. Thus, the tool 734, etc. can be precisely moved at high speed. Note that, in case that the sliders 712 and 724 are driven by timing belts as endless belts, the pitch of the timing belts for driving the slider 724 may be larger than the pitch of the timing belts for driving the slider 712, the fucnction will be the same as the system with such ball bearing screws.

The slider 712 may be slantingly attached in two- or three-dimensional with respect to the slider 724. Namely, X-and Y-rods 738 and 740 of the first two dimensional drive system 710 may be slanting in two- or three-dimension with respect to X- and Y-rods 730 and 732 of the second two dimensional drive system 720.

Further, other types of the first and/or the second two dimensional drive system can be adopted, and the shape of sliders (moving bodies) are also not limited. And two dimensional drive systems can be combined trebly or more.

Sixth Embodiment

Figure 15:
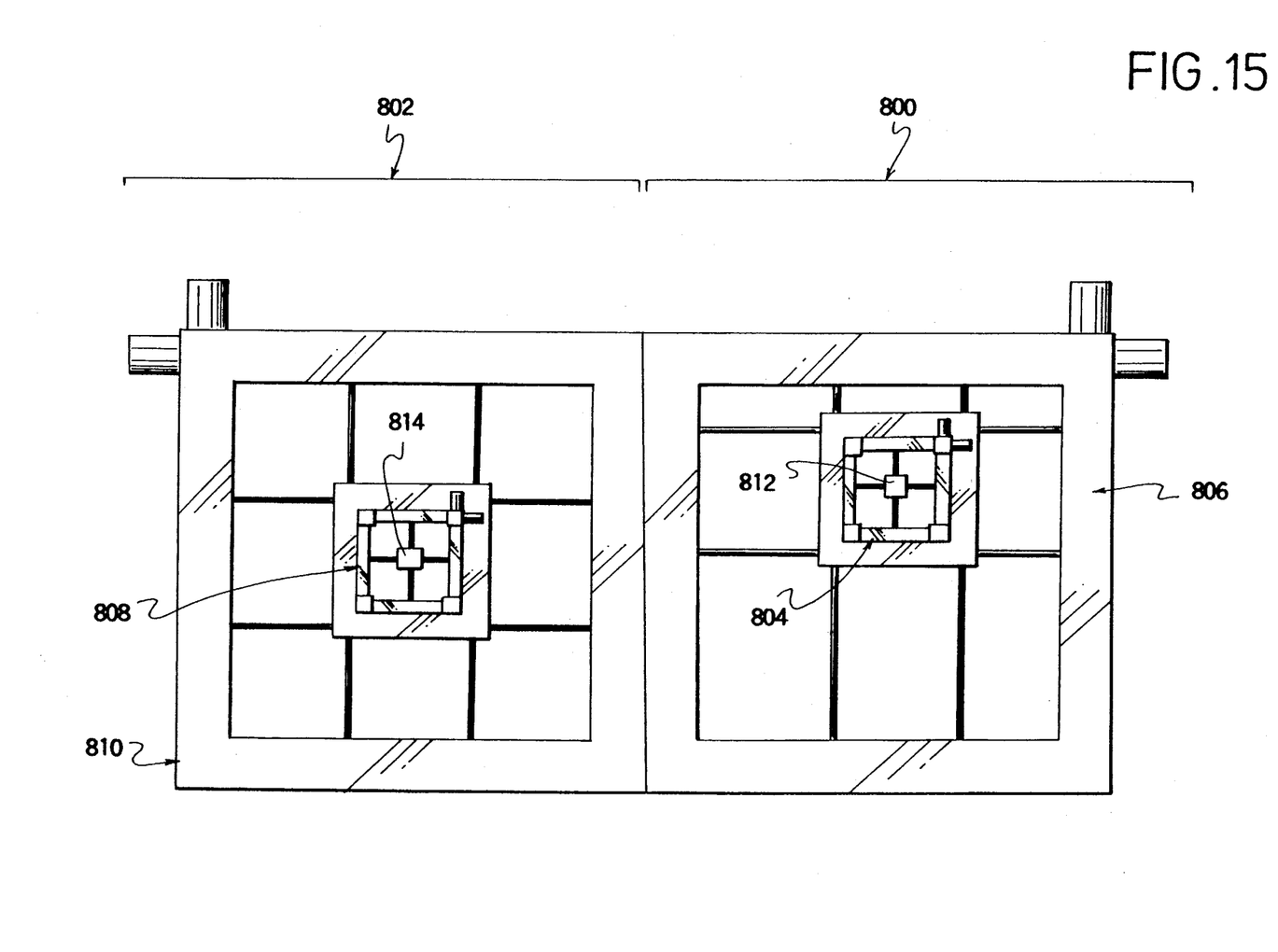
FIG. 15 shows a plan view of a drive system of a sixth embodiment.

The sixth embodiment will be explained with reference to FIG. 15.

This embodiment is a combined embodiment of the first and fifth embodiments.

The drive system has a first sub-drive system 800, which includes a first two dimensional drive system 804 and a second two dimensional drive system 806, and a second sub-drive system 802, which includes a first two dimensional drive system 808 and a second two dimensional drive system 810. A couple of sub-drive systems 800 and 802 are connected in a plane.

The sliders 812 and 814 can be moved independently, and a computer can control their complex movement with a simpler program.

Note that, three or more sub-drive systems can be connected in a plane.

Seventh Embodiment

Figure 16:
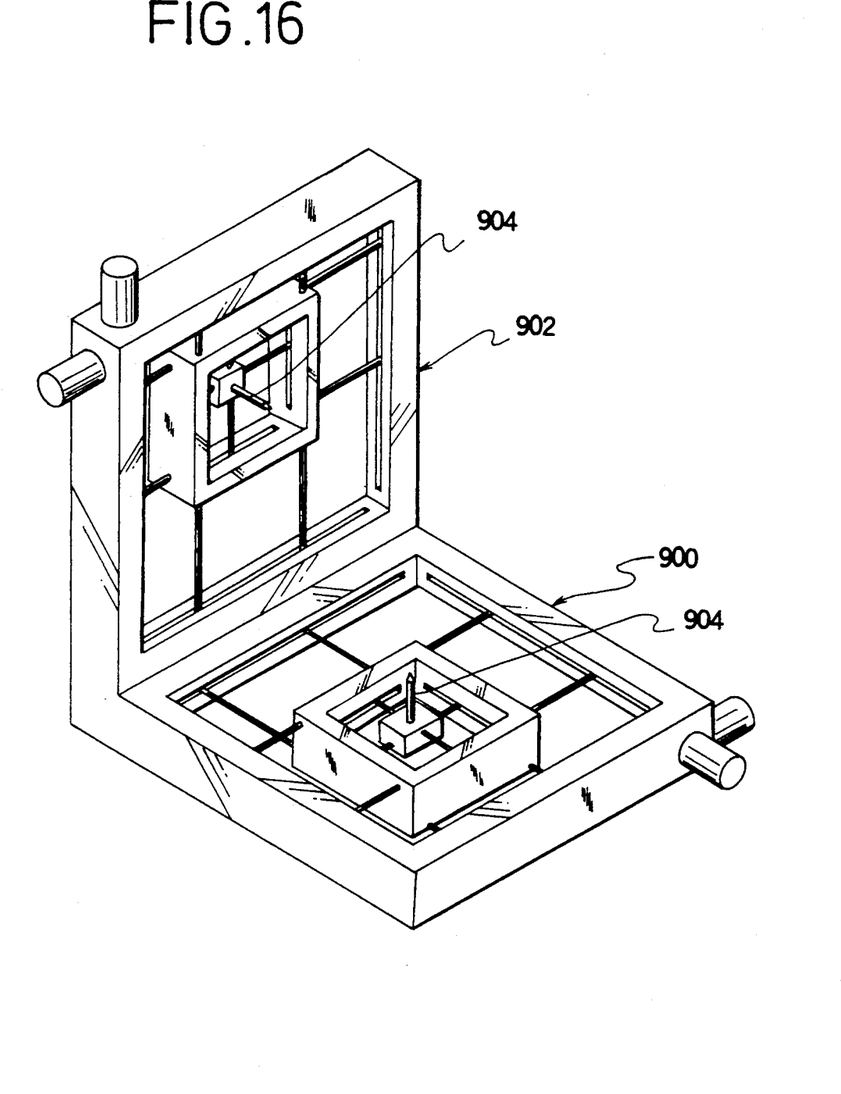
FIG. 16 shows a perspective view of a drive system of a seventh embodiment.

The seventh embodiment will be explained with reference to FIG. 16.

This embodiment is a combined embodiment of the third and fifth embodiments.

A couple of sub-drive systems 900 and 902 are connected in three-dimensions.

In this embodiment, for example, complex three-dimensional machining can be executed by tools 904.

Note that, three or more sub-drive systems can be connected in three-dimensions.

Now, preferred embodiments of the present invention have been described but the present invention is not limited to the above described embodiments. Many modifications can be allowed without deviating from the spirit of the invention.

What is claimed is:

1. A drive system comprising:

a first two dimensional drive system for moving a first moving body to discretionary positions in a plane by first driving means; and a second two dimensional drive system for moving a second moving body, the first two dimensional drive system being provided on the second moving body, the second two dimensional drive system moving the second moving body to discretionary positions in a plane by second driving means, a through-hole being provided in the center of the second moving body, and said first two dimensional drive system being provided in said through-hole.

2. The drive system according to claim 1, wherein the first driving means is a screw-drive mechanism.

3. The drive system according to claim 1, wherein the first driving means is a belt-drive mechanism.

4. The drive system according to claim 1, wherein the second driving means is a screw-drive mechanism.

5. The drive system according to claim 1, wherein the second driving means is a belt-drive mechanism.

6. The drive system according to claim 1, wherein the first moving body is a first slider and a second moving body is a second slider, the second slider having the first slider, the first two dimensional drive system and the first driving means located thereon.

7. The drive system according to claim 1, wherein the first moving body moves in a first plane and the second moving body moves in a second plane, the first and second planes being generally coplanar.

8. The drive system according to claim 1, wherein the first moving body moves in a first plane and the second moving body moves in a second plane, the first and second planes being located generally close to one another.

9. The drive system according to claim 1, wherein the first and second driving means can respectively move the first and second moving bodies with a composite motion.

* * * * *